United States Patent Office 2,720,482
Patented Oct. 11, 1955

2,720,482

STABILIZED STREPTOMYCIN SOLUTIONS

Jack T. Bryan, Metuchen, N. J., and Paul J. Daughenbaugh, Wrightstown, Pa., assignors to Merck & Co., Inc., Rahway, N. J., a corporation of New Jersey No Drawing. Application August 3, 1953,
Serial No. 372,204

14 Claims. (Cl. 167—65)

This invention relates to the stabilization of antibiotics and particularly to the stabilization of aqueous solutions of salts of streptomycin.

It has previously been considered impractical to prepare aqueous solutions containing salts of streptomycin for long-term storage because of their instability. For example, sterile aqueous solutions of streptomycin sulfate containing the equivalent of 500 milligrams of streptomycin per milliliter of solution were found to precipitate and discolor rapidly during storage. This occurred more rapidly at elevated storage temperatures, such as 40° C., but also may occur at normal room temperatures after a relatively short period of storage such as ten days. Such decomposition renders these aqueous solutions of antibiotics practically worthless for parenteral or other use. In addition to discoloration and precipitation, a decrease in the pH and the antibiotic potency of the solution will occur during storage.

In view of the instability of the aqueous solutions of salts of streptomycin, this antibiotic has heretofore been supplied for medical use in the form of a sterile, dry solid. To avoid harmful deterioration, aqueous solutions for therapeutic administration have usually been prepared from these solids immediately prior to use. Not only is the preparation of such solutions by the physician inconvenient but it is also attended by the ever-present hazard of bacterial contamination.

Many different types of stabilizers have been suggested for use to prevent deterioration of aqueous solutions of streptomycin. Some of the stabilizers proved effective for stabilizing the aqueous solutions of lower concentrations, that is, under 100 milligrams of antibiotics per milliliter of solution, but few were found to be effective in the higher ranges of concentration. Above a concentration of 250 milligrams per milliliter, the suggested stabilizers have generally proven ineffective to prevent deterioration, characterized by discoloration, during storage.

It has been suggested in the prior art that aqueous solutions of streptomycin may be stabilized against rapid deterioration by incorporating in the solutions mild reducing agents, such as bisulfites, sulfoxylates, thiosulfates, and the like. It has been found, however, that such reducing agents fail to give satisfactory stabilization of the solution and in particular fail to prevent the deterioration of the solutions having concentrations above 250 milligrams per milliliter.

A primary object of the invention is to improve aqueous solutions of salts of streptomycin from the standpoint of stability. Another object is to prevent aqueous solutions of salts of streptomycin, particularly those of high concentrations, from deteriorating during storage. Other objects and the advantages of this invention will appear hereinafter.

These and other objects are accomplished in accord with this invention by the preparation and use of a composite stabilizer comprising a water-soluble thio-difatty acid or one of its water-soluble esters and at least one salt of an inorganic acid or aldehyde addition products thereof. One such composite stabilizer that has been found particularly effective is $\beta,\beta'$-thiodipropionic acid or one of its water-soluble esters and at least one acid salt of sulfurous or hydrosulfurous acid or aldehyde addition products thereof. Examples of such acid salts are sodium bisulfite, sodium hydrosulfite, potassium metabisulfite, sodium formaldehyde sulfoxylate, and the like.

Among the esters of $\beta,\beta'$-thiodipropionic acid which may be used in this invention are water-soluble mono or diesters that are formed by the substitution of one or both of the hydrogen atoms of the hydroxyl groups in the acid radicals by alkyl, aryl, aralkyl or alicyclic radicals. The lower alkyl esters are particularly effective. The only practical limitation on the type of ester that may be used is that it must be soluble in the aqueous solution in the desired concentration.

The stabilizing effect which is obtained by the combination of the $\beta,\beta'$-thiodipropionic acid or one of its esters with the acid salt on an antibiotic solution is not taught by the prior art. Since the $\beta,\beta'$-thiodipropionic acid affords very little protection against deterioration and discoloration of such solutions, it appears that through this combination, a synergistic effect is obtained.

The best results are obtained by adding the composite stabilizer in the proportion of about 0.1 to 5 per cent by weight based on the weight of the aqueous solution. The $\beta,\beta'$-thiodipropionic acid or one of its esters is preferably used in the composite stabilizer within the range of 10 to 92 per cent by weight based on the total weight of the composite stabilizer and the acid salt is preferably within the range of 90 to 8 per cent by weight based on the total weight of the composite stabilizer. For higher concentrations of antibiotic it is preferred to use 3 to 5 per cent by weight based on the weight of the solution of the composite stabilizer comprising 25 to 50 per cent by weight of the $\beta,\beta'$-thiodipropionic acid or ester and 50 to 75 per cent by weight of the acid salt.

It has been found advantageous to employ more than one acid salt in the composite stabilizer, that is, the desired percentage of acid salt may be obtained by the use of two or more different acid salts. A particular marked improvement, indicating an additional synergistic effect, is obtained when the acid salt component is made up of one salt of sulfurous or hydrosulfurous acid and one aldehyde addition product of a salt of sulfurous or hydrosulfurous acid. As an example, a preferred composition for the composite stabilizer comprises 20 to 60 percent by weight of $\beta,\beta'$-thiodipropionic acid, 20 to 40 per cent by weight of sodium bisulfite and 20 to 40 per cent by weight of sodium formaldehyde sulfoxylate.

All of the salts of streptomycin may be effectively stabilized by this invention, including the sulfate, hydrochloride and calcium chloride double salts as well as mixtures of the salts.

The stabilizer of this invention is particularly useful in preventing discoloration of concentrated solutions of streptomycin sulfate which normally start discoloring upon preparing. The composite stabilizer is also effective in stabilizing mixtures of streptomycin and dihydrostreptomycin in aqueous solutions in the form of their salts, as for example a solution containing 50 per cent streptomycin and 50 per cent dihydrostreptomycin.

Other substances may be added to the aqueous solutions of this invention for the purpose of producing other advantageous properties in preparing pharmaceutically acceptable solutions. Sequestering agents, such as calcium disodium versenate, preservatives like benzyl alcohol or phenol are examples of such substances.

Also contemplated as part of this invention is the addition of other antibiotics to the stabilized solutions to obtain wider ranges of antibiotic activity. The addition of penicillin salts has proven particularly effective to provide solutions of greatly increased range of antibiotic activity.

Suitable buffers may be advantageously added to the solution to provide a pH which is most favorable to the stability of the particular antibiotic employed, since antibiotics generally tend to become unstable when exposed to acid or basic conditions. Among the buffering agents which may be utilized, are citrates, phosphates, acetates, and the like. It is ordinarily preferred to add a sufficient quantity of the buffering agent to adjust the pH of the solution to within a range of 4.0 to 8.0. It has been found that aqueous solutions of antibiotics containing a buffering agent, even in the absence of $\beta,\beta'$-thiodipropionic acid or a water-soluble ester or diester of the acid, show greatly increased stability, as compared with solutions having no buffer. In spite of the improvement shown by the antibiotic solutions while containing only a buffering agent, there is an objectionable discoloration of the solution on storage sufficient to render such solutions unsatisfactory for therapeutic use.

The stabilized antibiotic solutions provided by this invention are suitable for either parenteral or oral use. For oral use, the solution would be prepared generally in the same manner as for the parenteral use, and would contain, in addition, one or more of the flavoring or thickening agents commonly employed in such compositions. The stabilizer may be conveniently sterilized before mixing with the antibiotic by either heating or by aseptic filtration.

The following examples will illustrate the invention.

Example 1

A solution was prepared by dissolving the following substances in 50 milliliters of water:

| | Grams |
|---|---|
| Sodium bisulfite | 0.450 |
| Sodium formaldehyde sulfoxylate | 0.800 |
| $\beta,\beta'$-thiodipropionic acid | 0.650 |
| Sodium citrate | 1.986 |
| Crystalline phenol | 0.224 |

The solution was then sterilized by aseptic filtration. Sterile streptomycin sulfate (32.5 g.) was dissolved in a sufficient quantity of the sterile solution to make 50 cc. of final solution while agitating the solution. The solution was then clarified and subdivided into suitable vials under aseptic conditions. Such a solution was found to remain stable over an extended period of time.

Example 2

A solution was prepared in the same manner as in Example 1 having the following composition:

| | Grams |
|---|---|
| Streptomycin sulfate | 65.000 |
| Sodium bisulfite | 0.416 |
| Crystalline phenol | 0.268 |
| Sodium formaldehyde sulfoxylate | 0.960 |
| $\beta,\beta'$-thiodipropionic acid | 0.780 |
| Sodium citrate | 2.381 |
| Water to make 100.000 milliliters | |

This solution remained stable over an extended period of time.

Example 3

A solution was prepared in the same manner as in Example 1 having the following composition:

| | Grams |
|---|---|
| Streptomycin sulfate | 65.000 |
| Crystalline phenol | 0.268 |
| Sodium formaldehyde sulfoxylate | 0.960 |
| $\beta,\beta'$-thiodipropionic acid | 0.780 |
| Sodium citrate | 2.381 |
| Water to make 100.000 milliliters | |

The solution remained stable.

Example 4

A solution was prepared in the same manner as in Example 1 having the following composition:

| | Grams |
|---|---|
| Streptomycin sulfate | 32.500 |
| Dihydrostreptomycin sulfate | 32.500 |
| Sodium bisulfite | 0.416 |
| Crystalline phenol | 0.268 |
| Sodium formaldehyde sulfoxylate | 0.960 |
| $\beta,\beta'$-thiodipropionic acid | 0.780 |
| Sodium citrate | 2.381 |
| Water to make 100.000 milliliters | |

The sodium bisulfite or the sodium formaldehyde sulfoxylate in the above examples may be replaced with an equal weight of sodium bisulfite, of sodium formaldehyde sulfoxylate, of sodium hydrosulfite or of potassium metabisulfite without substantial alteration in the results.

Solutions made according to this invention will remain stable over extended periods of time in the order of at least twelve months, without substantial discoloration or loss in activity of the antibiotic. By this invention, it is possible to prepare concentrated solutions of over 500 milligrams of antibiotic per milliliter of solution which will remain stable over the usual long storage periods.

Various modifications and variations in the constituent elements and the percentages thereof in the stabilized solutions of the invention as set forth above which are within the spirit and scope of the invention will occur to persons skilled in the art. It is to be understood that the invention is not to be limited except as defined by the annexed claims.

We claim:

1. An aqueous solution of an antibiotic characterized as remaining stable during long storage periods containing at least one salt of streptomycin, the amount of said salt being equivalent to at least about 250 milligrams of streptomycin base per milliliter of solution, and a composite stabilizer comprising a compound selected from the group consisting of $\beta,\beta'$-thiodipropionic acid and its water-soluble esters and at least one acid salt selected from the group consisting of salts of sulfurous and hydrosulfurous acid and aldehyde addition products thereof.

2. An aqueous solution of an antibiotic characterized as remaining stable during long storage periods containing at least one salt of streptomycin, the amount of said salt being equivalent to at least about 250 milligrams of streptomycin base per milliliter of solution, and 0.1 to 5 per cent by weight based on the weight of the solution of a composite stabilizer comprising a compound selected from the group consisting of $\beta,\beta'$-thiodipropionic acid and its water-soluble esters and at least one acid salt selected from the group consisting of salts of sulfurous and hydrosulfurous acid and aldehyde addition products thereof.

3. An aqueous solution of an antibiotic characterized as remaining stable during long storage periods containing at least one salt of streptomycin, the amount of said salt being equivalent to at least about 250 milligrams of streptomycin base per milliliter of solution, and 0.1 to 5 per cent by weight based on the weight of the solution of a composite stabilizer comprising 10 to 92 per cent by weight based on the weight of the stabilizer of a compound selected from the group consisting of $\beta,\beta'$-thiodipropionic acid and its water-soluble esters and 8 to 90 per cent by weight based on the weight of the stabilizer of an acid salt selected from the group consisting of salts of sulfurous and hydrosulfurous acid and aldehyde addition products thereof.

4. An aqueous solution of an antibiotic characterized as remaining stable during long storage periods containing at least one salt of streptomycin, the amount of said salt being equivalent to at least about 250 milligrams of streptomycin base per milliliter of solution, and 3 to 5 per cent by weight based on the weight of the aqueous solution of a composite stabilizer comprising 25 to 50 per cent by weight based on the weight of the stabilizer of a compound selected from the group consisting of β,β'-thiodipropionic acid and its water-soluble esters and 75 to 50 per cent by weight based on the weight of the stabilizer of at least one acid salt selected from the group consisting of salts of sulfurous and hydrosulfurous acid and aldehyde addition products thereof.

5. An aqueous solution of an antibiotic characterized as remaining stable during long storage periods containing more than 250 milligrams per milliliter of solution of at least one salt of streptomycin, and a composite stabilizer comprising a compound selected from the group consisting of β,β'-thiodipropionic acid and its water-soluble esters and at least one acid salt selected from the group consisting of salts of sulfurous and hydrosulfurous acid and aldehyde addition products thereof.

6. An aqueous solution of an antibiotic characterized as remaining stable during long storage periods containing at least one salt of streptomycin, the amount of said salt being equivalent to at least about 250 milligrams of streptomycin base per milliliter of solution, a composite stabilizer comprising a compound selected from the group consisting of β,β'-thiodipropionic acid and its water-soluble esters and at least one acid salt selected from the group consisting of salts of sulfurous and hydrosulfurous acid and aldehyde addition products thereof, and a buffering agent.

7. An aqueous solution of an antibiotic characterized as remaining stable during long storage periods containing at least one salt of streptomycin, the amount of said salt being equivalent to at least about 250 milligrams of streptomycin base per milliliter of solution, a composite stabilizer comprising a compound selected from the group consisting of β,β'-thiodipropionic acid and its water-soluble esters and at least one acid salt selected from the group consisting of salts of sulfurous and hydrosulfurous acid and aldehyde addition products thereof, and a buffering agent, the amount of said buffering agent being sufficient to adjust the pH of the solution within the range of 4.0 to 8.0.

8. An aqueous solution of an antibiotic characterized as remaining stable during long storage periods containing at least one salt of streptomycin, the amount of said salt being equivalent to at least about 250 milligrams of streptomycin base per milliliter of solution, and a composite stabilizer comprising β,β'-thiodipropionic acid and at least one acid salt selected from the group consisting of salts of sulfurous and hydrosulfurous acid and aldehyde addition products thereof.

9. An aqueous solution of an antibiotic characterized as remaining stable during long storage periods containing at least one salt of streptomycin, the amount of said salt being equivalent to at least about 250 milligrams of streptomycin base per milliliter of solution, and 0.1 to 5 per cent by weight based on the weight of the aqueous solution of a composite stabilizer comprising a compound selected from the group consisting of β,β'-thiodipropionic acid and its water-soluble esters, an acid salt selected from the group consisting of salts of sulfurous and hydrosulfurous acid and aldehyde addition products thereof and a second acid salt selected from the group consisting of aldehyde addition products of salts of sulfurous and hydrosulfurous acid.

10. An aqueous solution of an antibiotic characterized as remaining stable during long storage periods containing at least one salt of streptomycin, the amount of said salt being equivalent to at least about 250 milligrams of streptomycin base per milliliter of solution, and 0.1 to 5 per cent by weight based on the weight of the aqueous solution of a composite stabilizer comprising 20 to 60 per cent by weight of β,β'-thiodipropionic acid, 20 to 40 per cent by weight of sodium bisulfite and 20 to 40 per cent by weight of sodium formaldehyde sulfoxylate.

11. An aqueous solution of an antibiotic characterized as remaining stable during long storage periods containing at least 250 milligrams of streptomycin sulfate per milliliter of solution, and a composite stabilizer comprising β,β'-thiodipropionic acid, sodium bisulfite and sodium formaldehyde sulfoxylate.

12. An aqueous solution of an antibiotic characterized as remaining stable during long storage periods containing at least 250 milligrams of streptomycin sulfate per milliliter of solution, and a composite stabilizer comprising β,β'-thiodipropionic acid and sodium formaldehyde sulfoxylate.

13. An aqueous solution of antibiotics characterized as remaining stable during long storage periods containing at least one salt of streptomycin, at least one salt of dihydrostreptomycin the total amount of the salts being equivalent to at least about 250 milligrams of antibotic base per milliliter of solution, and a composite stabilizer comprising a compound selected from the group consisting of β,β'-thiodipropionic acid and its water-soluble esters and at least one acid salt selected from the group consisting of salts of sulfurous and hydrosulfurous acid and aldehyde addition products thereof.

14. An aqueous solution of antibiotics characterized as remaining stable during long storage periods containing at least one salt of streptomycin, at least one salt of dihydrostreptomycin the total amount of the salts being equivalent to at least about 250 milligrams of antibiotic base per milliliter of solution, and 0.1 to 5 per cent by weight based on the weight of the aqueous solution of a composite stabilizer comprising a compound selected from the group consisting of β,β'-thiodipropionic acid and its water-soluble esters, an acid salt selected from the group consisting of salts of sulfurous and hydrosulfurous acid and aldehyde addition products thereof and a second acid salt selected from the group consisting of aldehyde addition products of salts of sulfurous and hydrosulfurous acid.

References Cited in the file of this patent

UNITED STATES PATENTS

| | | |
|---|---|---|
| 2,473,339 | Kirchmeyer | June 14, 1949 |
| 2,563,835 | Gribbins | Aug. 14, 1951 |
| 2,643,998 | Bray | June 30, 1953 |
| 2,657,171 | Macek | Oct. 27, 1953 |